US011973751B2

(12) United States Patent
Proch et al.

(10) Patent No.: US 11,973,751 B2
(45) Date of Patent: Apr. 30, 2024

(54) REMOTE CERTIFICATE AUTHORITY MANAGEMENT

(71) Applicant: KeyFactor, Inc., Independence, OH (US)

(72) Inventors: Jonathan Proch, Independence, OH (US); Edward Shorter, Munroe Falls, OH (US); Rex Edward Wheeler, Portland, OR (US)

(73) Assignee: Keyfactor, Inc., Independence, OH (US)

( * ) Notice: Subject to any disclaimer, the term of this patent is extended or adjusted under 35 U.S.C. 154(b) by 298 days.

(21) Appl. No.: 17/528,353

(22) Filed: Nov. 17, 2021

(65) Prior Publication Data

US 2022/0210148 A1 Jun. 30, 2022

Related U.S. Application Data

(60) Provisional application No. 63/131,085, filed on Dec. 28, 2020.

(51) Int. Cl.
*H04L 9/40* (2022.01)
*G06F 9/48* (2006.01)
*H04L 67/1097* (2022.01)

(52) U.S. Cl.
CPC ........ *H04L 63/0823* (2013.01); *G06F 9/4843* (2013.01); *H04L 63/20* (2013.01); *H04L 67/1097* (2013.01)

(58) Field of Classification Search
CPC . H04L 63/0823; H04L 63/20; H04L 67/1097; H04L 9/006; H04L 9/3268; G06F 9/4843
See application file for complete search history.

(56) References Cited

U.S. PATENT DOCUMENTS 6,970,862 B2 * 11/2005 Kwan ................... H04L 9/3268
705/76
7,328,344 B2 * 2/2008 Chang ................. H04L 63/0823
713/168

(Continued)

FOREIGN PATENT DOCUMENTS

CN 103490881 A 1/2014
CN 104378386 A 2/2015

(Continued)

OTHER PUBLICATIONS

European Patent Office, Search Report and Written Opinion issued in International Patent Application No. PCT/US2021/059618 dated Feb. 28, 2022, 11 pages.

(Continued)

*Primary Examiner* — J. Brant Murphy
(74) *Attorney, Agent, or Firm* — Thompson Hine LLP

(57) ABSTRACT

The subject matter of this specification generally relates to cloud-hosted certificate lifecycle management (CLM) to on-premises certificate authority (CA) communication. In some implementations, a method includes receiving a task request specifying a requested task and an identifier specifying a location for task execution, determining the requested task and that the location for task execution for the requested task is at an on-premises CA device, in response to determining the requested task and that the location of the task is at the on-premises CA device, storing a request task data entry that links the task request to the location for task execution, providing a notification to an on-premises CA gateway, and in response to the notification, providing the requested task for task execution. In some implementations, the remote CA gateway plug-in module maintains a constant communication connection with the on-premises CA gateway via a persistent client-initiated communication protocol.

20 Claims, 4 Drawing Sheets

(56) References Cited

U.S. PATENT DOCUMENTS

| | | | |
|---|---|---|---|
| 7,418,597 B2 * | 8/2008 | Thornton | H04L 63/20 713/168 |
| 7,568,095 B2 | 7/2009 | Thornton et al. | |
| 7,650,496 B2 | 1/2010 | Thornton et al. | |
| 7,650,497 B2 | 1/2010 | Thornton et al. | |
| 7,653,810 B2 | 1/2010 | Thornton et al. | |
| 7,698,549 B2 | 4/2010 | Thornton et al. | |
| 7,937,583 B2 | 5/2011 | Thornton et al. | |
| 8,745,378 B1 * | 6/2014 | Galehouse | H04L 63/0823 713/156 |
| 8,832,432 B2 * | 9/2014 | Galehouse | H04L 63/0823 713/156 |
| 9,455,979 B2 | 9/2016 | Blanke | |
| 9,503,447 B2 * | 11/2016 | Manolov | H04L 67/02 |
| 9,634,834 B1 * | 4/2017 | Pelton | H04L 9/3268 |
| 10,063,382 B1 * | 8/2018 | Mehta | H04L 9/321 |
| 10,110,595 B2 * | 10/2018 | Choyi | H04L 9/3247 |
| 11,019,493 B2 | 5/2021 | De Wijs et al. | |
| 11,218,456 B2 | 1/2022 | Nakagawa | |
| 2012/0209947 A1 * | 8/2012 | Glaser | G06F 9/5027 709/217 |
| 2014/0068251 A1 * | 3/2014 | Ignaci | H04L 9/006 713/158 |
| 2015/0341445 A1 | 11/2015 | Nikolov et al. | |
| 2016/0277391 A1 * | 9/2016 | Choyi | H04L 63/062 |
| 2018/0013579 A1 * | 1/2018 | Fairweather | G06F 8/76 |
| 2018/0131525 A1 * | 5/2018 | Kass | H04L 67/01 |
| 2021/0266185 A1 * | 8/2021 | Konda | H04L 61/4511 |

FOREIGN PATENT DOCUMENTS

| | | | |
|---|---|---|---|
| EP | 2817917 | B1 | 4/2018 |
| IN | 2009/MUM/2014 | A | 1/2015 |
| JP | 2015-226322 | A | 12/2015 |
| JP | 2017-528963 | A | 9/2017 |
| JP | 2019-192953 | A | 10/2019 |
| JP | 2020-502672 | A | 1/2020 |
| KR | 100335995 | B1 | 5/2002 |
| KR | 100844436 | B1 | 7/2008 |

OTHER PUBLICATIONS

The International Bureau of WIPO, International Preliminary Report on Patentability issued in International Patent Application No. PCT/US2021/059618 dated Jul. 13, 2023, 8 pages.

ManageEngine, "Key Manager Plus completely automates life cycle management for certificates issued by Microsoft Certificate Authority," available at https://www.manageengine.com/key-manager/microsoft-ca-certificate-signing.html; pp. 1-4 (accessed on Nov. 13, 2020).

Marina Egea et al., "A Certification Framework for Cloud Security Properties: The Monitoring Path," avainable at https://link.springer.com/chapter/10.1007/978-3-319-17199-9_3; pp. 1-3 (Apr. 1, 2015).

"Configure infrastructure to support SCEP with Intune," available at https://docs.microsoft.com/en-us/mem/intune/protect/certificates-scep-configure; pp. 1-20 (Oct. 8, 2020).

Japanese Patent Office; Notice of Allowance issued in Japanese Patent Application No. 2023-563906 on Mar. 14, 2024; 3 pages.

* cited by examiner

REMOTE CERTIFICATE AUTHORITY MANAGEMENT

CROSS-REFERENCE TO RELATED APPLICATIONS

This application claims the benefit of U.S. Provisional Application No. 63/131,085, filed Dec. 28, 2020, which is hereby incorporated by reference herein in its entirety.

TECHNICAL FIELD

The present disclosure generally relates to computer network security, and more specifically, to systems and methods for implementing and managing security policies for computing devices requesting access to a secure network via cloud-hosted services.

BACKGROUND

Certificate Authority (CA) software is used to create digital certificates, which are cryptographically-signed digital parallels to a driver's license or passport. Digital certificates are used for a wide variety of use cases, including user or website authentication, digitally signing software, or encrypting information between systems. The applications which use certificates have become very prevalent (e.g., millions of certificates in an organization), and thus tracking, managing, updating, and issuing the certificates securely is a challenge.

As a part of standard functionality, Certificate Lifecycle Management (CLM) software initiates network connections to the CA software, to perform functions such as requesting new certificates, renewing certificates, revoking certificates, or to obtain an inventory of issued certificates. These connections are initiated by the CLM software, typically on behalf of end-users of the CLM software, and communicate with Application Programming Interface (API) endpoints available from the CA software entity.

Many entities run CA software in their own environment, due to the sensitive nature of CAs and the cryptographic keys the entities use to do their job. As such, these CA systems are often protected with the highest levels of network and physical security controls available.

In contrast, many organizations wish to have their CLM software running in cloud-based or 3rd-party hosted environments, for the many benefits that cloud-hosted, or software as a service (SaaS) models can provide. This need for connectivity, and disparity of environments, produces challenges that are difficult to overcome. Contacting a customer's internally-hosted CA software from a cloud-hosted environment is difficult, if not impossible, due to the stringent controls that organizations place on their networks— especially around sensitive systems such as CAs. Currently available options for supporting this usage pattern would typically be to set up a Virtual Private Network (VPN) between the cloud-hosted software and the organization's network, or for the organization to expose their CA software to the Internet via reverse network proxy or similar technology. However, neither of these options are very appealing to CA users, as they open up the exposed "attack surface" between the two environments and increase the risk of a cyberattack.

SUMMARY

This specification describes systems, methods, devices, and techniques for facilitating secure communication between a Certificate Authority (CA) and a Certificate Lifecycle Management (CLM) system with a mechanism to bridge the sensitive network environments that CA software typically sits in, to cloud environments where the CLM software is hosted. The approach utilizes outbound network connections from the sensitive CA data center, while enabling the CLM system to make use of the CA on a real-time, dynamic basis that CLM use cases dictate using a persistent client-initiated communication protocol. A persistent client-initiated communication protocol which may include WebSocket protocols or a "long poll" approach is leveraged in conjunction with a task management and orchestration and gateway framework to achieve the goal for persistent client communication.

In general, one innovative aspect of the subject matter described in this specification can be embodied in computer-implemented methods that include the actions of receiving, by a remote certificate authority (CA) gateway core from a certificate lifecycle management (CLM) application installed on a user device, a task request specifying a requested task and an identifier specifying a location for task execution, determining, by a task pickup interface on a remote CA gateway plug-in module and based on the task request, the requested task and that the location for task execution for the requested task is at an on-premises CA device, in response to determining the requested task and that the location of the task is at the on-premises CA device, storing, in a data storage device on the remote CA gateway plug-in module, a request task data entry that links the task request to the location for task execution, providing, from the remote CA gateway plug-in module, a notification to an on-premises CA gateway, wherein the remote CA gateway plug-in module maintains a constant communication connection with the on-premises CA gateway via a persistent client-initiated communication protocol, and in response to the notification, providing, from the on-premises CA gateway to the on-premises CA device, the requested task for task execution.

These and other embodiments can each optionally include one or more of the following features.

In some aspects, the on-premises CA gateway initiates the constant communication connection with the remote CA gateway plug-in module prior to receiving the task request.

In some aspects, the persistent client-initiated communication protocol is based on WebSocket protocols. In some aspects, the persistent client-initiated communication protocol is based on long polling communication protocols.

In some aspects, the method further includes receiving, at the on-premises CA gateway from the on-premises CA device, task results based on the task execution by the on-premises CA device, receiving, at the remote CA gateway plug-in module from the on-premises CA gateway via the persistent client-initiated communication protocol, the task results, storing, in the data storage device on the remote CA gateway plug-in module, the task results, determining, by a task assignment interface on the remote CA gateway plug-in module that the task results was received in the data storage device, and providing, by the remote CA gateway core, the task results to the user device via the CLM application.

In some aspects, the on-premises CA gateway includes a client connection manager, and the remote CA gateway plug-in module includes a client connection receiver.

In some aspects, the on-premises CA gateway includes a CA gateway plug-in module and a CA management gateway module configured to manage the constant communication connection with the remote CA gateway plug-in module and the CA gateway plug-in module in communication with the on-premises CA device.

In some aspects, the one or more client servers includes the on-premises CA gateway. In some aspects, the remote CA gateway plug-in module includes a task assignment interface that is configured to store the request task data in the data storage device.

In some aspects, the remote CA gateway plug-in module includes a cache API and the on-premises CA gateway includes a synchronizer configured to access the cache API to synchronize inventory and configuration data hosted on the remote CA gateway plug-in module.

Particular embodiments of the subject matter described in this specification can be implemented so as to realize one or more of the following advantages. For example, systems and methods discussed herein provide a mechanism to achieve a CA usage pattern, while requiring only a single piece of software deployed in the customer environment, which makes only outbound connections back to the CA gateway environment, essentially reversing the "communication initiation" requirement discussed herein. Additionally, outbound connections from private entity networks to cloud-hosted services are more acceptable—and secure—than allowing inbound connections to the CAs.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

Various features and advantages of the foregoing subject matter is described below with respect to the figures. Additional features and advantages are apparent from the subject matter described herein and the claims.

DESCRIPTION OF DRAWINGS

Like reference numbers and designations in the various drawings indicate like elements.

DETAILED DESCRIPTION

The present disclosure can be understood more readily by reference to the following detailed description, examples, drawing, and claims. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

To address problems associated with facilitating secure communication between a Certificate Authority (CA) and a Certificate Lifecycle Management (CLM) system in a cloud-hosted environment, the present disclosure provides a mechanism to bridge the sensitive network environments that CA software typically sits in, to cloud environments where the CLM software is hosted. This approach uses outbound network connections from the sensitive CA data center, while enabling the CLM system to make use of the CA on a real-time, dynamic basis that CLM use cases dictate. A client-initiated communication protocol such as a WebSocket protocol, a long polling protocol, and the like, may be leveraged in conjunction with a task management and orchestration and gateway framework to achieve a goal for persistent client-initiated communication.

Figure 1:
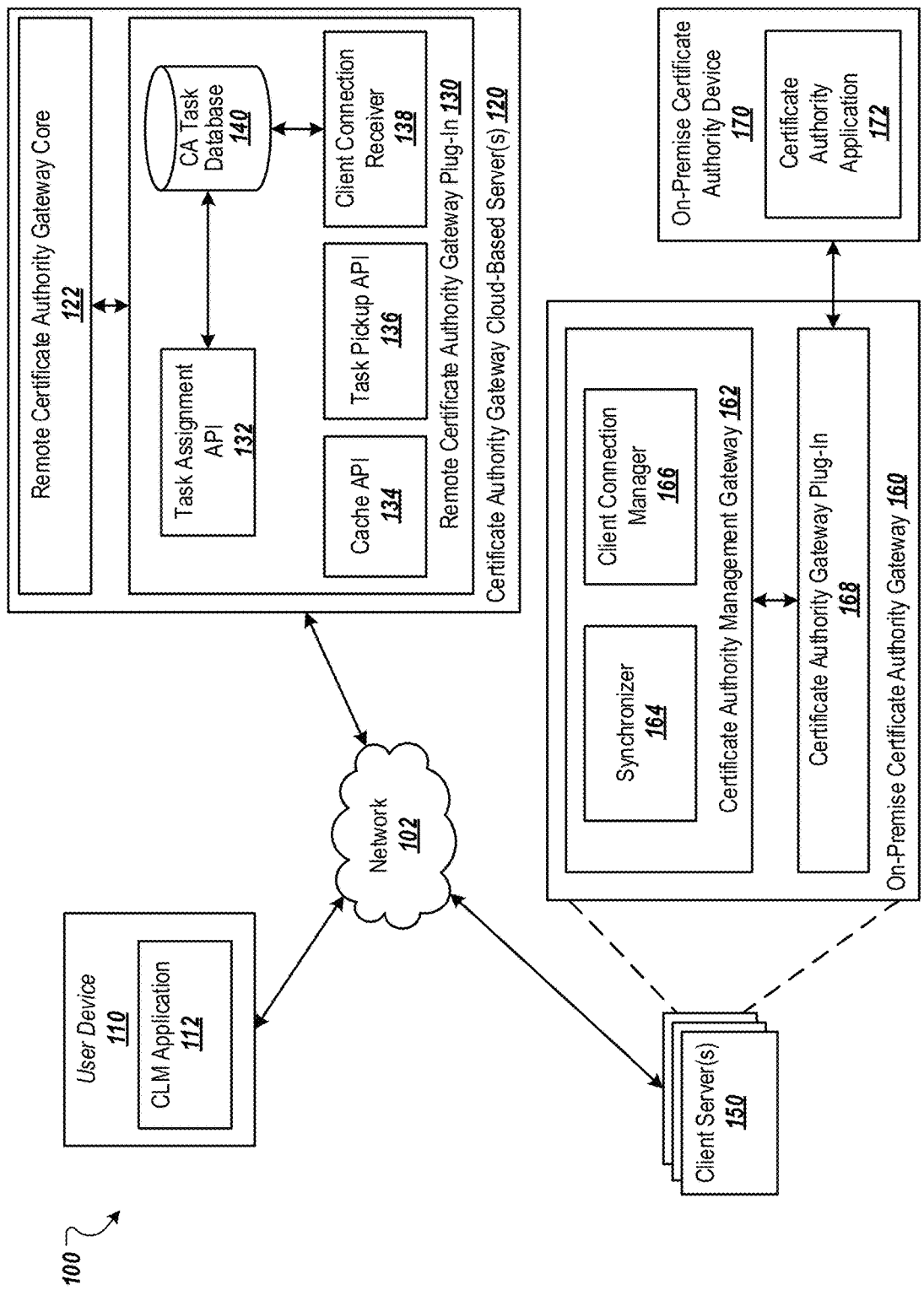
FIG. 1 is an example environment in which a CLM application on a device communicates to an on-premises CA through a cloud-based CA gateway and a CA management gateway plugin located on-premises, according to examples of the present disclosure.

FIG. 1 is an example environment 100 in which a CLM system communicates task request to an on-premises CA through a CA gateway in a cloud environment. The example environment 100 includes a user device 110, one or more CA gateway cloud-based server(s) 120, and one or more client server(s) 150 that communicate over a data communication network 102, e.g., a local area network (LAN), a wide area network (WAN), the Internet, a mobile network, or a combination thereof. Additionally, the example environment 100 includes an on-premises CA device 170, which may be stored on the one or more client server(s) 150, or as a separate device or server at the client site.

The user device 110 can include a desktop, a laptop, a server, or a mobile device, such as a smartphone, tablet computer, wearable device (e.g., smartwatch), in-car computing device, and/or other types of mobile devices. The user device 110 includes applications, such as the CLM application 112 for managing the task request and task result data to/from the remote CA gateway core 122 at the one or more CA gateway cloud-based server(s) 120. The user device 110 can include other applications.

The one or more CA gateway cloud-based server(s) 120 manages the location of the task requests received from a CLM application from one or more user devices. The task management protocols of one or more CA gateway cloud-based server(s) 120 are based on a redundant load-balancing system by managing multiple clients (e.g., client server(s) 150) so that a task is handled by one client server 150. For example, there may be multiple clients that are able to service the requested task, and the redundant load-balancing system is responsible for ensuring that the task is performed by exactly one of the capable clients.

The one or more CA gateway cloud-based server(s) 120 include a remote CA gateway core 122 and a remote CA gateway plug-in 130. The remote CA gateway core 122 presents a standardized interface to the CLM platform (e.g., user device 110 via the CLM application 112), and allows the CA-specific plugin to perform the necessary functions on a given CA type. The remote CA gateway plug-in 130 hosted in the cloud environment, includes a CA task database 140 to store task requests and task results, and a task assignment API 132 that communicates with the CA task database 140. The remote CA gateway plug-in 130 also includes a task pickup API 132 that can process the necessary details of each task request received to execute the task (e.g., location data for task execution).

The remote CA gateway plug-in 130 further includes a client connection receiver 138 to provide a persistent client-initiated communication with another system (e.g., the on-premises CA gateway 160) via a client connection manager 166 based on a persistent client-initiated communication protocol. In some implementations, WebSocket protocol may be used for the persistent client-initiated communication. WebSocket protocol is a computer communications protocol, providing full-duplex communication channels over a single TCP connection. Additionally, or alternatively, a long poll communication protocol may be used for the persistent client-initiated communication. A "long polling" technique is where the server elects to hold a client's connection open for as long as possible, delivering a response only after data becomes available or a timeout threshold is reached.

When the client connection receiver 138 in the cloud environment sees that a request task has appeared in the CA task database 140 for execution, the client connection receiver 138 can notify the on-premises CA management gateway 162 at the on-premises CA gateway 160 using the persistent client-initiated communication connection. A persistent client-initiated communication protocol (i.e., WebSocket, long polling, etc.) provides a technique where the cloud-hosted server holds a client connection open for as long as possible, delivering a response only after data becomes available (e.g., a task result such as a CA validation) or a timeout threshold has been reached (e.g., greater than one minute). After receiving a response, a client system can immediately send the next request. In some implementations, on the client side, a single request is managed. When the response is received, the client can initiate a new request, repeating this process as many times as necessary.

The remote CA gateway plug-in 130 further includes a cache API 134 that allows communication of configuration information and any state information about the on-premises CA gateway 160 hosted on-premises to be stored in the cloud environment. For example, the configuration information, task request/result data, and the like, can be centrally managed at the remote CA gateway plug-in module 130 in the cloud environment. Any time the CA gateway plug-in 168 needs to access this information, it can communicate with an inventory and configuration synchronizer (e.g., synchronizer 164) at the CA management gateway 162. The CA management gateway 162 includes an in-memory cache backed by access to the cache API 134 at the remote CA gateway plug-in 130 to fetch data from the hosted cloud environment as needed.

The one or more client servers can host the on-premises CA gateway 160 which manages and communicates with the remote CA gateway plug-in 130. The term "on-premises" used throughout this disclosure refers to servers, devices, systems, etc., that are physically located at a client site, such that the CA modules discussed herein (e.g., the on-premises CA gateway 160) are installed at the one or more client server(s) 150. The on-premises CA gateway 160 includes a CA management gateway 162 and a CA gateway plug-in 168. The CA management gateway 162 includes the synchronizer 164 and the client connection manager 166 for persistent communication with the client connection receiver 138. The synchronizer 164 includes the in-memory cache backed by access to the cache API 134 at the remote CA gateway plug-in 130 to fetch data from the hosted cloud environment as needed. The CA gateway plug-in 168 manages the communications between the CA management gateway 162 and a CA application 172 on the on-premises CA gateway device 170.

In an exemplary implementation, when a CA management gateway service (e.g., the on-premises CA gateway 160) is installed and turned on at the one or more client servers 150, the CA management gateway 162 initiates the network connection. For example, the CA management gateway 162 establishes a network connection via the client connection manager 166 to the client connection receiver 138 in the cloud environment though network 102. This persistent client-initiated communication allows the client connection receiver 138 to record in the CA task database 140 that the CA management gateway 162 is configured, connected, and ready to receive tasks. In some implementations, WebSocket protocol may be used for the persistent client-initiated communication. WebSocket protocol is a computer communications protocol, providing full-duplex communication channels over a single TCP connection. Additionally, or alternatively, a long poll communication protocol may be used for the persistent client-initiated communication. A "long polling" technique is where the server elects to hold a client's connection open for as long as possible, delivering a response only after data becomes available or a timeout threshold is reached.

At this point (e.g., after the persistent client-initiated communication has been established), the client connection manager 166 and client connection receiver 138 maintain a constant connection, such that the CA management gateway 162 can be notified when a task is ready to be executed. When the CA management gateway 162 service is stopped for any reason (machine restart, etc.), this persistent client-initiated communication connection would be severed, allowing the client connection receiver 138 to mark the CA management gateway 162 as unavailable for receiving and executing tasks in the CA task database 140.

In some implementations, an example execution of managing communications between a cloud-hosted certificate lifecycle management system (e.g., CA gateway cloud-based servers 120) and an on-site CA system may be initiated when a CLM system sends a task request to execute a task at an on-site CA system (e.g., on-premises CA 170). For example, the user device 110 using the CLM application 112 contacts the remote CA gateway core 122 in the cloud environment (e.g., CA gateway cloud-based servers 120) with the task details. This causes the remote CA gateway plug-in 130 in the cloud environment to utilize the task assignment API 132 to place the pending task in the CA task database 140. When the client connection receiver 138 at the remote CA gateway plug-in 130 sees that a task has appeared in the CA task database 140 for execution, the client connection receiver 138 notifies the CA management gateway 162 at the client server(s) 150 using an existing connection (e.g., a persistent client-initiated communication protocol) via the client connection manager 166. The CA management gateway 162 can then communicate with and use the task pickup API 136 at the remote CA gateway plug-in 130 to get the necessary details to execute the task (e.g., location data for task execution). The task is then executed by calling a CA gateway plug-in 168 at the client server(s) 150, which in turn communicates with the CA application 172 at the on-premises CA device 170.

Additionally, results from the on-premises CA device 170 can follow this example communication path in reverse. For example, task results from CA application 172 can be communicated through the CA gateway plug-in 168 to the CA management gateway 162. The task pickup API 136 can add the task result data in the CA task database 140. The task assignment API 132, after seeing the task result data being stored in the CA task database 140, can then return task results to the originator of the task request via the CA gateway core 122. The CA gateway core 122 can then communicate the task results (e.g., CA validation data) back to the CLM system (e.g. user device 110 via CLM application 112). This process appears synchronous to the CLM system, so is well-suited for interactive use. For example, the end user receives the success and/or failure of the requested task shortly after it is requested via the persistent client-initiated communication protocol, rather than needing to communicate back with the CA at a subsequent time.

In some implementations, one or more of the components, servers, devices, etc. of the example environment 100 are virtualized using either a hypervisor or a container. For example, a hypervisor may utilize a full operating system executed on top of a host operating system where the hypervisor manages different virtual machines and each virtual machine may utilize a different operating system. Container-based virtualization (also referred to as operating system virtualization) isolates the processes utilizing the host operating system instead of trying to run an entire guest operating system. Each container corresponds to each virtual environment. The operating system provides process isolation between virtual environments and performs resource management and designates for each process, i.e., each virtual environment or each container, its own filesystem, memory, and devices.

Figure 2:
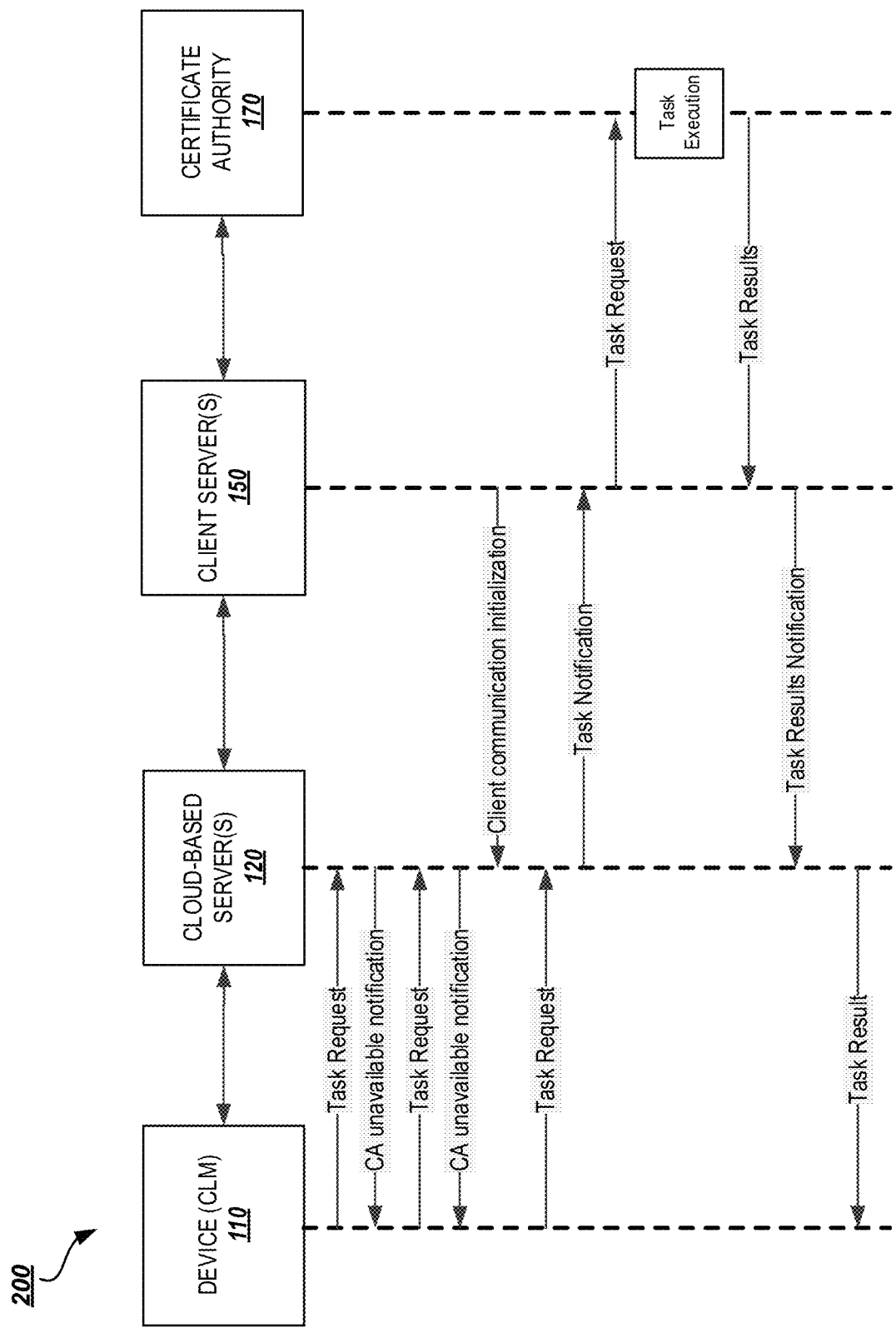
FIG. 2 illustrates a timing diagram of a method for communicating between a CLM application on a device and an on-premises CA utilizing a cloud-based CA gateway protocol, according to examples of the present disclosure.

FIG. 2 illustrates a timing diagram 200 of a method for executing a task at an on-premises CA from a request via a cloud-hosted certificate lifecycle management system via a persistent client-initiated communication protocol, according to examples of the present disclosure. A task request data message is generated at and transmitted from the device 110 to the cloud-based servers 120. However, until the client server(s) 150 have initiated the persistent communication protocol to the cloud-based servers 120 via a CA management gateway, the cloud-based servers 120 will return an unavailable notification. For example, when the CA management gateway 162 service is stopped for any reason (machine restart, etc.), this persistent client-initiated communication connection would be severed, allowing the client connection receiver 138 to mark the CA management gateway 162 as unavailable for receiving and executing tasks in the CA task database 140.

After a constant communication connection is initiated by the client server(s) 150 with the cloud-based server(s) 120, then a task request can be processed by the system. Thus, as illustrated in FIG. 2, a task request data message is generated at and transmitted from the device 110 to the cloud-based servers 120, at which point, since a persistent client-initiated communication connection is on, the task request data message is effectively sent to the client server(s) 150 and to the on-premises CA device 170. The CA device 170 responds to the task request message with the executed task results message through the client server(s) 150, the cloud-based server(s) 120, and back to the device 110. For example, as discussed herein, when a CLM system needs to execute a task on an on-premises CA, it contacts the CA gateway in the cloud environment with the task details. This causes a remote CA gateway plug-in in the cloud environment to utilize a task assignment API to place the pending task in a CA task database. When the client connection receiver at the remote CA gateway plug-in sees that a task has appeared in the database for execution, the client connection receiver notifies the CA management gateway at the client server(s) 150 using an existing constant client connection (e.g., a persistent client-initiated communication protocol such as WebSocket protocol, long polling protocols, etc.). The CA management gateway can then communicate with and use the task pickup API at the remote CA gateway plug-in to get the necessary details to execute the task (e.g., location data for task execution). The task is then executed by calling a CA gateway plug-in at the client server(s) 150, which in turn communicates with the on-premises CA. Results from the on-premises CA then follow this path in reverse, flowing back through the CA gateway plug-in to the task pickup API. The task result data is then placed in the CA task database, where the task assignment API can then return results to the caller in the CA gateway core in the cloud-based server(s) 120, which in turn communicates the task results (e.g., CA validation data) back to the CLM system (e.g. user device 110 via CLM application 112).

Figure 3:
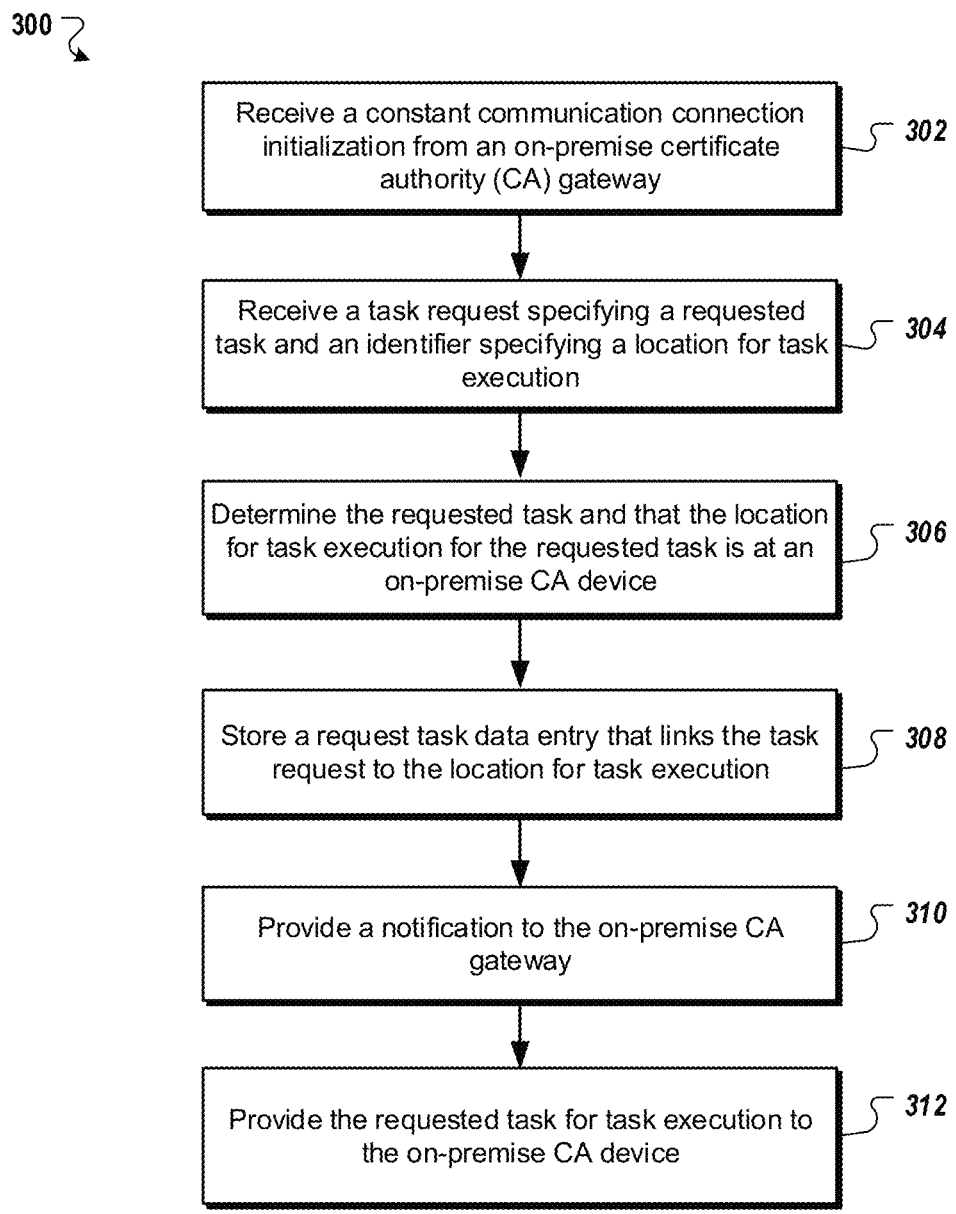
FIG. 3 is a flowchart of an example process for providing data to an on-premises CA via a cloud-based CA gateway and a CA management gateway plugin located on-premises.

FIG. 3 illustrates a flowchart of an example process 300 for managing a system for cloud-hosted CLM to on-premises CA communications. Operations of the process 300 can be implemented, for example, by a system that includes one or more data processing apparatus, such as one or more CA gateway cloud-based server(s) 120 and on-premises CA gateway 160 on one or more client server(s) 150 of FIG. 1. The process 300 can also be implemented by instructions stored on computer storage medium, where execution of the instructions by a system that includes a data processing apparatus cause the data processing apparatus to perform the operations of the process 300.

In an exemplary implementation, one or more CA gateway cloud-based servers manages the location of the task requests received from a CLM application from one or more user devices. The task management protocols of the one or more CA gateway cloud-based servers are based on a redundant load-balancing system by managing multiple clients so that a task is handled by an on-premise CA gateway at a client site. For example, there may be multiple clients that are able to service the requested task, and the redundant load-balancing system of process 300 is responsible for ensuring that the task is performed by exactly one of the capable clients.

The system receives a constant communication connection initialization from an on-premise CA gateway (302). The constant communication connection initialization may be received by a client connection receiver (e.g., client connection receiver 138) at the remote certificate authority gateway plug-in module on the cloud-based server(s). The constant communication connection provides a persistent client-initiated communication between the cloud-server(s) and the on-premise CA gateway at the client site. In some implementations, WebSocket protocol may be used for the persistent client-initiated communication. WebSocket protocol is a computer communications protocol, providing full-duplex communication channels over a single TCP connection. Additionally, or alternatively, a long poll communication protocol may be used for the persistent client-initiated communication. A "long polling" technique is where the server elects to hold a client's connection open for as long as possible, delivering a response only after data becomes available or a timeout threshold is reached.

The system receives a task request specifying a requested task and an identifier specifying a location for task execution (304). The task request may be received by a remote CA gateway core (e.g., remote CA gateway core 122) from a CLM application installed on a user device (e.g., CLM application 112 on user device 110). For example, when a CLM system needs to execute a task on the on-premises CA, the CLM system contacts a CA gateway in the cloud environment with the task details.

The system determines the requested task and that the location for task execution for the requested task is at an on-premises CA device (306). The system may determine the requested task and that the location for task execution for the requested task by a task pickup interface (e.g., task pickup API 136) on a remote CA gateway plug-in module (e.g., remote CA gateway plug-in module 130). For example, contacting the CA gateway in the cloud environment with the task details initiates the remote CA gateway plug-in to communicate with a task assignment API.

In response to determining the requested task and that the location of the task is at the on-premises CA device, the system stores a request task data entry that links the task request to the location for task execution (308). The system may store the request task data entry in a data storage device (e.g., CA task database 140) on the remote CA gateway plug-in module (e.g., remote CA gateway plug-in module 130). For example, contacting the CA gateway in the cloud environment with the task details initiates the remote CA gateway plug-in to use the task assignment API to place the pending task in a CA task database.

The system provides a notification via a persistent client-initiated communication protocol (310). The notification may be provided from the remote CA gateway plug-in module (e.g., remote CA gateway plug-in module 130) to the on-premises CA gateway on one or more client servers (e.g., on-premises CA gateway 160 on one or more client servers 150). In some implementations, the remote CA gateway plug-in module maintains a constant communication connection with the on-premises CA gateway via a persistent client-initiated communication protocol. In some implementations, the persistent client-initiated communication protocol is based on WebSocket communication protocols. Alternatively, in some implementations, the persistent client-initiated communication protocol is based on long poll communication protocols. For example, when a client connection receiver (e.g., client connection receiver 138) in the CA gateway cloud environment sees that a request task has appeared in the CA task database for execution, the client connection receiver notifies the CA management gateway (e.g., on-premises CA management gateway 162 on the on-premises CA gateway 160) using an existing persistent client connection.

In response to the providing of the notification, the system provides the requested task for task execution to the on-premises CA device (312). The requested task may be provided to the on-premises CA device (e.g., on-premises CA device 170) from the on-premises CA gateway (e.g., on-premises CA gateway 160) hosted on site by one or more client servers.

In some implementations, the process 300 further includes receiving, at the on-premises CA gateway from the on-premises CA device, task results based on the task execution by the on-premises CA device, receiving the task results at the remote CA gateway plug-in module via the persistent client-initiated communication protocol storing the task results in the data storage device, determining that the task results was received in the data storage device, and providing the task results to the user device. For example, task results from the CA follow the task request path in reverse, flowing back through the CA gateway plug-in and up to the task pickup API. The result data may then be stored in the CA task database, where the task assignment API may initiate the return to the caller in the CA gateway core. The CA gateway core in turn communicates the task results to the CLM system. Thus, this send and receive process appears synchronous to the CLM system, so is well-suited for interactive use because the end user (e.g., at the user device 110 utilizing CLM application 112) needs to know the success/failure of the requested task shortly after it is requested, rather than needing to check back later.

In an exemplary implementation, the CA database is hosted in the cloud environment utilizing a cache API. The cache API (e.g., cache API 134) allows communication of configuration information and any state information about the CA management gateway hosted on-premises to be stored in the cloud environment, where the configuration information, task request/result data, and the like, can be centrally managed at the remote CA gateway plug-in module in the cloud environment. Any time the CA gateway plug-in needs to access this information, it can communicate with an inventory and configuration synchronizer (e.g., synchronizer 164) at the CA management gateway. The CA management gateway (e.g., CA management gateway 162) includes an in-memory cache backed by access to the cache API at the remote CA gateway plug-in to fetch data from the hosted cloud environment as needed.

Figure 4:
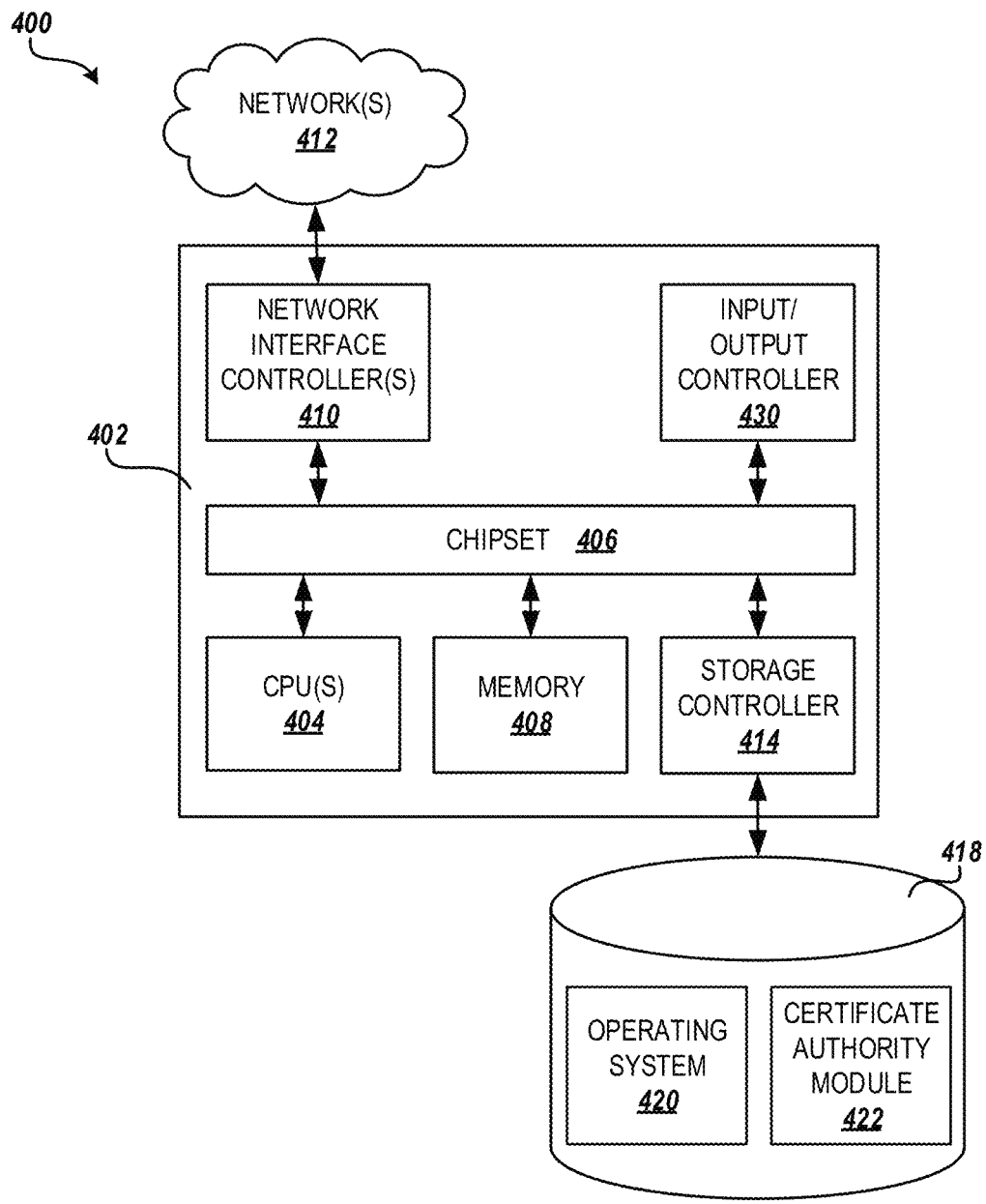
FIG. 4 is a block diagram showing an example computer architecture for a computer capable of executing the software components described herein, according to embodiments described herein.

FIG. 4 illustrates an example computer architecture 400 for a computer 402 capable of executing the software components described herein for the sending/receiving and processing of tasks for the CA components. The computer architecture 400 (also referred to herein as a "server") shown in FIG. 4 illustrates a server computer, workstation, desktop computer, laptop, or other computing device, and may be utilized to execute any aspects of the software components presented herein described as executing on a host server, or other computing platform. The computer 402 preferably includes a baseboard, or "motherboard," which is a printed circuit board to which a multitude of components or devices may be connected by way of a system bus or other electrical communication paths. In one illustrative embodiment, one or more central processing units (CPUs) 404 operate in conjunction with a chipset 406. The CPUs 404 can be programmable processors that perform arithmetic and logical operations necessary for the operation of the computer 402.

The CPUs 404 preferably perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 406 provides an interface between the CPUs 404 and the remainder of the components and devices on the baseboard. The chipset 406 may provide an interface to a memory 408. The memory 408 may include a random access memory (RAM) used as the main memory in the computer 402. The memory 408 may further include a computer-readable storage medium such as a read-only memory (ROM) or non-volatile RAM (NVRAM) for storing basic routines that that help to startup the computer 402 and to transfer information between the various components and devices. The ROM or NVRAM may also store other software components necessary for the operation of the computer 402 in accordance with the embodiments described herein.

According to various embodiments, the computer 402 may operate in a networked environment using logical connections to remote computing devices through one or more networks 412, a local-area network (LAN), a wide-area network (WAN), the Internet, or any other networking topology known in the art that connects the computer 402 to the devices and other remote computers. The chipset 406 includes functionality for providing network connectivity through one or more network interface controllers (NICs) 410, such as a gigabit Ethernet adapter. For example, the NIC 410 may be capable of connecting the computer 402 to other computer devices in the utility provider's systems. It should be appreciated that any number of NICs 410 may be present in the computer 402, connecting the computer to other types of networks and remote computer systems beyond those described herein.

The computer 402 may be connected to at least one mass storage device 418 that provides non-volatile storage for the computer 402. The mass storage device 418 may store system programs, application programs, other program modules, and data, which are described in greater detail herein. The mass storage device 418 may be connected to the computer 402 through a storage controller 414 connected to the chipset 406. The mass storage device 418 may consist of one or more physical storage units. The storage controller 414 may interface with the physical storage units through a serial attached SCSI (SAS) interface, a serial advanced technology attachment (SATA) interface, a fiber channel (FC) interface, or other standard interface for physically connecting and transferring data between computers and physical storage devices.

The computer 402 may store data on the mass storage device 418 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 418 is characterized as primary or secondary storage, or the like. For example, the computer 402 may store information to the mass storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 402 may further read information from the mass storage device 418 by detecting the physical states or characteristics of one or more particular locations within the physical storage units.

The mass storage device 418 may store an operating system 420 utilized to control the operation of the computer 402. According to some embodiments, the operating system includes the LINUX operating system. According to another embodiment, the operating system includes the WINDOWS® SERVER operating system from MICROSOFT Corporation of Redmond, Wash. According to further embodiments, the operating system may include the UNIX or SOLARIS operating systems. It should be appreciated that other operating systems may also be utilized. The mass storage device 418 may store other system or application programs and data utilized by the computer 402, such as a CA module 422 utilized by the computer 402 to manage communications in a communication network for CA gateway communications, as described herein.

In some embodiments, the mass storage device 418 may be encoded with computer-executable instructions that, when loaded into the computer 402, transforms the computer 402 from being a general-purpose computing system into a special-purpose computer capable of implementing the embodiments described herein. These computer-executable instructions transform the computer 402 by specifying how the CPUs 404 transition between states, as described above. According to some embodiments, from the host server 106 perspective, the mass storage device 418 stores computer-executable instructions that, when executed by the computer 402, perform portions of the process 300 of managing cloud-hosted CLM to on-premises CA communications, as described herein. In further embodiments, the computer 402 may have access to other computer-readable storage medium in addition to or as an alternative to the mass storage device 418.

The computer 402 may also include an input/output controller 430 for receiving and processing input from a number of input devices, such as a keyboard, a mouse, a touchpad, a touch screen, an electronic stylus, or other type of input device. Similarly, the input/output controller 430 may provide output to a display device, such as a computer monitor, a flat-panel display, a digital projector, a printer, a plotter, or other type of output device. It will be appreciated that the computer 402 may not include all of the components shown in FIG. 4, may include other components that are not explicitly shown in FIG. 4, or may utilize an architecture completely different than that shown in FIG. 4.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving, by a remote certificate authority (CA) gateway core from a certificate lifecycle management (CLM) application installed on a user device, a task request specifying a requested task and an identifier specifying a location for task execution;
   determining, by a task pickup interface on a remote CA gateway plug-in module and based on the task request, that the requested task and the location for the task execution for the requested task are at an on-premises CA device;
   in response to determining that the requested task and the location of the task execution are at the on-premises CA device, storing, in a data storage device on the remote CA gateway plug-in module, a request task data entry that links the task request to the location for the task execution;
   providing, from the remote CA gateway plug-in module, a notification to an on-premises CA gateway, wherein the remote CA gateway plug-in module maintains a constant communication connection with the on-premises CA gateway via a persistent client-initiated communication protocol; and
   in response to the notification, providing, from the on-premises CA gateway to the on-premises CA device, the requested task for the task execution.

2. The computer-implemented method of claim 1, wherein the on-premises CA gateway initiates the constant communication connection with the remote CA gateway plug-in module prior to receiving the task request.

3. The computer-implemented method of claim 1, wherein the persistent client-initiated communication protocol is based on WebSocket protocols.

4. The computer-implemented method of claim 1, wherein the persistent client-initiated communication protocol is based on long polling communication protocols.

5. The computer-implemented method of claim 1, further comprising:
   receiving, at the on-premises CA gateway from the on-premises CA device, task results based on the task execution by the on-premises CA device;
   receiving, at the remote CA gateway plug-in module from the on-premises CA gateway via the persistent client-initiated communication protocol, the task results;
   storing, in the data storage device on the remote CA gateway plug-in module, the task results;
   determining, by a task assignment interface on the remote CA gateway plug-in module that the task results were received in the data storage device; and
   providing, by the remote CA gateway core, the task results to the user device via the CLM application.

6. The computer-implemented method of claim 1, wherein the on-premises CA gateway comprises a client connection manager, and the remote CA gateway plug-in module comprises a client connection receiver.

7. The computer-implemented method of claim 1, wherein the on-premises CA gateway comprises a CA gateway plug-in module and a CA management gateway module configured to manage the constant communication connection with the remote CA gateway plug-in module and the CA gateway plug-in module in communication with the on-premises CA device.

8. The computer-implemented method of claim 1, wherein the on-premises CA gateway comprises one or more client servers.

9. The computer-implemented method of claim 1, wherein the remote CA gateway plug-in module comprises a task assignment interface that is configured to store the request task data entry in the data storage device.

10. The computer-implemented method of claim 1, wherein the remote CA gateway plug-in module comprises a cache API and the on-premises CA gateway comprises a synchronizer configured to access the cache API to synchronize inventory and configuration data hosted on the remote CA gateway plug-in module.

11. A system, comprising:
    a data processing apparatus; and
    a non-transitory computer readable storage medium in data communication with the data processing apparatus and storing instructions executable by the data processing apparatus and upon such execution cause the data processing apparatus to perform operations comprising:
       receiving, by a remote certificate authority (CA) gateway core from a certificate lifecycle management (CLM) application installed on a user device, a task request specifying a requested task and an identifier specifying a location for task execution;
       determining, by a task pickup interface on a remote CA gateway plug-in module and based on the task request, that the requested task and the location for the task execution for the requested task are at an on-premises CA device;
       in response to determining that the requested task and the location of the task execution are at the on-premises CA device, storing, in a data storage device on the remote CA gateway plug-in module, a request task data entry that links the task request to the location for the task execution;

providing, from the remote CA gateway plug-in module, a notification to an on-premises CA gateway, wherein the remote CA gateway plug-in module maintains a constant communication connection with the on-premises CA gateway via a persistent client-initiated communication protocol; and in response to the notification, providing, from the on-premises CA gateway to the on-premises CA device, the requested task for the task execution.

12. The system of claim 11, wherein the on-premises CA gateway initiates the constant communication connection with the remote CA gateway plug-in module prior to receiving the task request.

13. The system of claim 11, wherein the persistent client-initiated communication protocol is based on WebSocket protocols.

14. The system of claim 11, wherein the persistent client-initiated communication protocol is based on long polling communication protocols.

15. The system of claim 11, wherein the on-premises CA gateway comprises a client connection manager, and the remote CA gateway plug-in module comprises a client connection receiver.

16. The system of claim 11, wherein the on-premises CA gateway is further configured to:

receive, from the on-premises CA device, task results based on the task execution by the on-premises CA device.

17. The system of claim 11, the operations further comprising:

receiving, at the remote CA gateway plug-in module from the on-premises CA gateway via the persistent client-initiated communication protocol, the task results;

storing, in the data storage device on the remote CA gateway plug-in module, the task results;

determining, by a task assignment interface on the remote CA gateway plug-in module that the task results were received in the data storage device; and providing, by the remote CA gateway core, the task results to the user device via the CLM application.

18. The system of claim 11, wherein the on-premises CA gateway comprises a CA management gateway module configured to manage the constant communication connection with the remote CA gateway plug-in and a CA gateway plug-in module in communication with the on-premises CA device.

19. A non-transitory computer storage medium encoded with a computer program, the computer program comprising instructions that when executed by one or more data processing apparatus cause a data processing apparatus to perform operations comprising:

receiving, by a remote certificate authority (CA) gateway core from a certificate lifecycle management (CLM) application installed on a user device, a task request specifying a requested task and an identifier specifying a location for task execution;

determining, by a task pickup interface on a remote CA gateway plug-in module and based on the task request, that the requested task and the location for the task execution for the requested task are at an on-premises CA device;

in response to determining that the requested task and the location of the task execution are at the on-premises CA device, storing, in a data storage device on the remote CA gateway plug-in module, a request task data entry that links the task request to the location for the task execution;

providing, from the remote CA gateway plug-in module, a notification to an on-premises CA gateway, wherein the remote CA gateway plug-in module maintains a constant communication connection with the on-premises CA gateway via a persistent client-initiated communication protocol; and in response to the notification, providing, from the on-premises CA gateway to the on-premises CA device, the requested task for the task execution.

20. The non-transitory computer storage medium of claim 19, wherein the on-premises CA gateway initiates the constant communication connection with the remote CA gateway plug-in module prior to receiving the task request.

* * * * *